(12) United States Patent
Bhattacharyya et al.

(10) Patent No.: US 11,232,135 B2
(45) Date of Patent: Jan. 25, 2022

(54) METHODS AND SYSTEM OF USING N-GRAM ANALYSIS TO DISCOVER POINTS OF INTEREST IN A GIVEN GEOGRAPHIC REGION

(71) Applicants: Shantanu Bhattacharyya, New Dehli (IN); Geet Garg, New Dehli (IN); Vittal Sirigiri, New Dehli (IN); Darshan Kathiriya, Surat (IN)

(72) Inventors: Shantanu Bhattacharyya, New Dehli (IN); Geet Garg, New Dehli (IN); Vittal Sirigiri, New Dehli (IN); Darshan Kathiriya, Surat (IN)

( * ) Notice: Subject to any disclaimer, the term of this patent is extended or adjusted under 35 U.S.C. 154(b) by 52 days.

(21) Appl. No.: 16/839,041

(22) Filed: Apr. 2, 2020

(65) Prior Publication Data
US 2021/0311970 A1 Oct. 7, 2021

(51) Int. Cl.
*G06F 16/29* (2019.01)
*G06F 16/22* (2019.01)

(52) U.S. Cl.
CPC ............ *G06F 16/29* (2019.01); *G06F 16/22* (2019.01)

(58) Field of Classification Search
None
See application file for complete search history.

(56) References Cited

U.S. PATENT DOCUMENTS

| | | | | |
|---|---|---|---|---|
| 9,442,905 | B1* | 9/2016 | Kawaguchi | G06F 16/958 |
| 2005/0171691 | A1* | 8/2005 | Smartt | G01C 21/3605 |
| | | | | 701/426 |
| 2011/0311140 | A1* | 12/2011 | Urbach | G06K 9/00664 |
| | | | | 382/182 |
| 2012/0054174 | A1* | 3/2012 | Gagnier | G06F 16/29 |
| | | | | 707/714 |
| 2015/0220566 | A1* | 8/2015 | Cumming | G06F 16/955 |
| | | | | 707/711 |
| 2016/0275401 | A1* | 9/2016 | Cao | G06N 20/00 |
| 2021/0263972 | A1* | 8/2021 | Cooper | G06F 16/909 |
| 2021/0279750 | A1* | 9/2021 | Breunig | H04W 4/021 |

* cited by examiner

*Primary Examiner* — Christopher J Raab (57) ABSTRACT

A computerized method for optimizing a geocoding process by automatically determining points of interest (POIs) within a locality includes the step of providing, from a first database comprising a first set of POIs, wherein the first set of POIs are obtained from a government agency. The method includes the step of geocoding all the POIs in the first database. The method includes the step of providing a second database of a second set of POIs that exist only in local context but not part of first database maintained by the government agency. The method includes the step of geocoding all the POIs in the second database. The second database is generated by the step of using n-gram analysis to discover a second set of POIs in a geographic region of the locality of the first database.

12 Claims, 8 Drawing Sheets

```
{'set1': {'roundedLatLng': {'lat': 12.9356, 'lng': 77.6109},
 'ngramsCount': {'20': 1,
   '205': 13,
   '602': 1,
   '3 607': 2,
   'india': 1,
   'adugodi': 8,
   'next to': 10,
   '20 hosur': 3,
   'athens 1': 1,
   'athens 2': 19,
   'athens 3': 4,
   'flat 007': 1,
   'sparta 2': 1,
   'to forum': 10,
   'bengaluru': 7,
   'karnataka': 25,
   'main road': 7,
   'mall next': 2,
   'road next': 1,
   '007 athens': 1,
   '1 prestige': 1,
   '107 athens': 1,
   '2 prestige': 20,
```

FIGURE 7

```
{'set1': {'roundedLatLng': {'lat': 12.9356, 'lng': 77.6109},
  'ngramsCount': {'205': 13,
   'next to': 10,
   'athens 2': 19,
   'to forum': 10,
   'karnataka': 25,
   '2 prestige': 20,
   '205 athens': 13,
   'forum mall': 12,
   'koramangala': 14,
   '205 athens 2': 13,
   'next to forum': 10,
   'to forum mall': 10,
   '560029 karnataka': 24,
   'bangalore 560029': 18,
   'athens 2 prestige': 19,
   'prestige acropolis': 25,
   '2 prestige acropolis': 20,
   'acropolis koramangala': 13,
   'koramangala bangalore': 13,
   'bangalore 560029 karnataka': 18,
   'athens 2 prestige acropolis': 13,
   'koramangala bangalore 560029': 13,
   'prestige acropolis koramangala': 13,
   'acropolis koramangala bangalore': 13}},
 'set2': {'roundedLatLng': {'lat': 12.9356, 'lng': 77.611},
  'ngramsCount': {'205': 26,
   'adugodi': 17,
   'next to': 17,
   'athens 2': 46,
   'to forum': 17,
   'bengaluru': 13,
```

METHODS AND SYSTEM OF USING N-GRAM ANALYSIS TO DISCOVER POINTS OF INTEREST IN A GIVEN GEOGRAPHIC REGION

BACKGROUND

Geocoding is the technique of attributing a GPS coordinate to a human readable, typically text based, address. A key component of geocoding is the ability to parse specific unambiguous text information from the address and then map it to a latitude, longitude pair (latlng) on Earth. Most of the geocoding providers have large databases of these specific texts, also referred to as "Points of Interest" (POI). These can be parsed from an address and a known latlng attributed to them. In one example, a brute force approach can be to visit every single location and collect the name and latlng pair for that location. However, this approach is not very scalable, Another approach is to manually tag the POI in the addresses and figure out what the laths for that POI is based on associated information. This associated information could be a user marking it on the map or a transaction completed on that address. This approach is also time consuming and subject to errors. Additionally, most of the efforts in the geocoding field are spent on mapping latlngs to full address or finding latlngs for known POIs. Accordingly, improvements to geocoding POIs are desired.

BRIEF SUMMARY

A computerized method for optimizing a geocoding process by automatically determining points of interest (POIs) within a locality includes the step of providing, from a first database comprising a first set of POIs, wherein the first set of POIs are obtained from a government agency. The method includes the step of geocoding all the POIs in the first database. The method includes the step of providing a second database of a second set of KM that exist only in local context but not part of first database maintained by the government agency. The method includes the step of geocoding all the POIs in the second database. The second database is generated by the step of using n-gram analysis to discover a second set of POIs in a geographic region of the locality of the first database. The method includes the step of generating a data structure for each POI of the second set of POIs, wherein the data structure comprises an address followed by a latlng pair for each discovered POI. The method clusters all the addresses of the second set of POI that belong to the defined geographic area. The method flips each data structure such that a latlng points to an address for each POI of the second set of POIs.

BRIEF DESCRIPTION OF THE DRAWINGS

The Figures described above are a representative set and are not an exhaustive with respect to embodying the invention.

DESCRIPTION

Disclosed are a system, method, and article for using N-gram analysis to discover points of interest in a given geographic region. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method, Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Bigram is a sequence of two adjacent elements from a string of tokens, which are typically letters, syllables, or words. A bigram is an n-gram for n=2.

Cloud computing can involve deploying groups of remote servers and/or software networks that allow centralized data storage and online access to computer services or resources. These groups of remote serves and/or software networks can be a collection of remote computing services.

Global Positioning System (GPS) is a satellite-based radio navigation system owned by the United States government and operated by the United States Space Force.

Latitude is a geographic coordinate that specifies the north-south position of a point on the Earth's surface. Latitude is an angle which ranges from at the Equator to 90° (North or South) at the poles.

Longitude is a geographic coordinate that specifies the east-west position of a point on the Earth's surface. Longitude is an angular measurement (e.g. expressed in degrees). A longitude pair (latlng) can be a pair of latitude and longitude coordinates.

n-gram is a contiguous sequence of n items from a given sample of text or speech. The items can be phonemes, syllables, letters, words or base pairs according to the application.

Point of interest (POI) can be a specific point location that someone may find useful or interesting.

Trigrams are a special case of the n-gram, where n is there (3).

EXAMPLE METHODS

Figure 1:
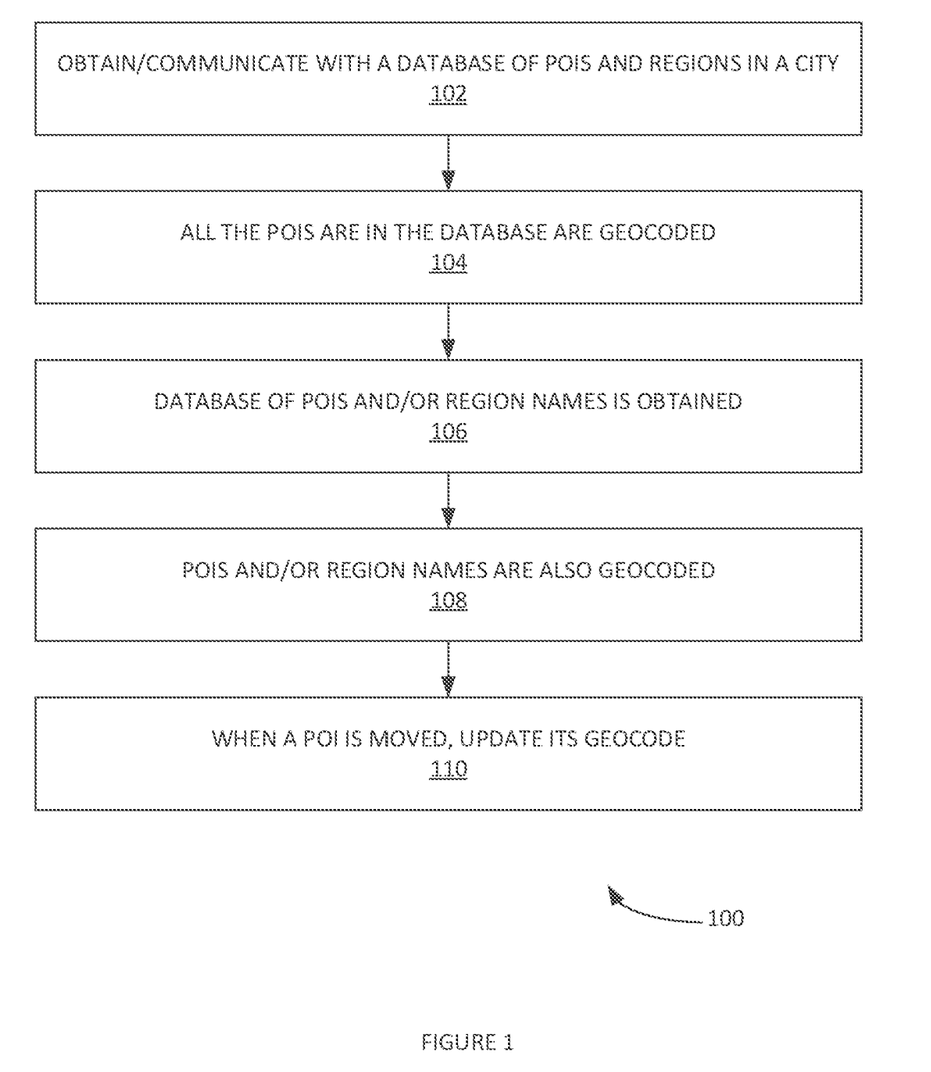
FIG. 1 illustrates an example process for determining POIs and/or specified regions within a city (e.g. a locality).

FIG. 1 illustrates an example process 100 for determining POIS and/or specified regions within a city (e.g. a locality). Process 100 uses a raw address and delivers a latling information. In step 102, process 100 obtains/communicates with a database of POIs and regions in a city. In step 104, all the POIS are in the database are geocoded. For example, any new address and the address in the database can be geocoded. In step 106, a database of POIs and/or region names (e.g. that exist only in local context but not part of official location of databases maintained by Govt agencies, etc.) can be obtained. In step 108, these POIs and/or region names are also geocoded. Optionally, in step 110, when a POI is moved, process 100 can update its geocode. Process 100 can determine that a POI has moved to a new location. process 100 can automatically determine the new location (e.g. geocode the new location) over a few iterations.

Figure 2:
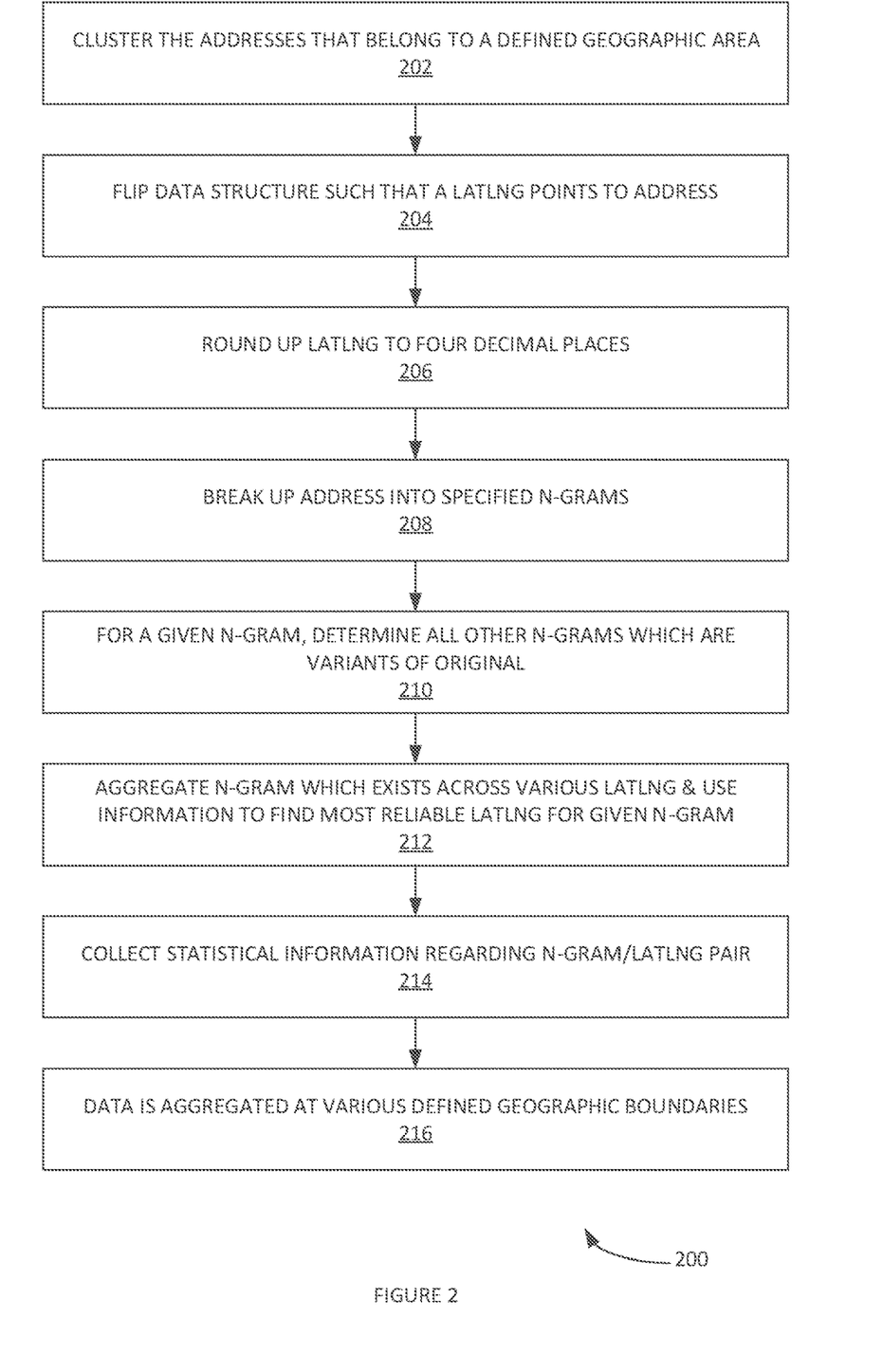
FIG. 2 illustrates an example process for using n-gram analysis to discover points of interest in a given geographic region, according to some embodiments.

FIG. 2 illustrates an example process 200 for using n-gram analysis to discover points of interest in a given geographic region, according to some embodiments. The standard data structure is that of an address followed by a latlng pair. In step 202, process 200 can cluster all the addresses that belong to a defined geographic area. The usual clustering process is heavy on computation. Step 202 can include collecting/generating a data structure where the address points to the latlng information. In step 204, process 200 can flip the data structure such that a latlng points to an address. Step 204 can leverage the fact that every decimal of the latlng has information embedded in it.

In step 206, process 200 can round up the latlng of the flipped data structure to four (4) decimal places. Process 200 can group by latlng and capture all addresses belonging to that particular latlng. In step 208, the address is broken up into specified n-grams (e.g. bigrams, trigrams, n-grams, csvgrams, etc.). In step 210, for a given n-gram, process 200 can determine all other n-grams which are variants of the original. These can be minor spelling mistakes, abbreviated words, etc. Process 200 can then aggregate the n-gram occurrence count.

In step 212, process 200 can aggregate the n-gram which exists across various latlng and use this information to find a most reliable latlng for a given n-gram. In step 214, process 200 can collect the statistical information regarding the n-gram/latlng pair. This can be used as a decision point on whether to store that n-gram/latlng pair in the database. In step 216, data is aggregated at various defined geographic boundaries.

Process 200 can determine the correct n-grams to focus on followed by the weighted consideration of said n-grams. Process 200 can determine that an n-gram is a POI or a region. Process 200 can be used to distinguishing between multiple POIs with the same name but different locations. Process 200 can increase the speed of database creation by using novel data models.

Processes 100 and 200 can be integrated into an enterprises and/or map services geocoding algorithm. In this way, processes 100 and 200 can improve geocoding services by leveraging a dataset of latlngs mapped to a batch of addresses (e.g. see FIGS. 3-5 infra and Routing engine server(s) 306, etc.). Processes 100 and 200 can enable previously unknown POIs and regions to be mapped to precise coordinates that can be saved in a database for further usage.

EXAMPLE SYSTEMS

Figure 3:
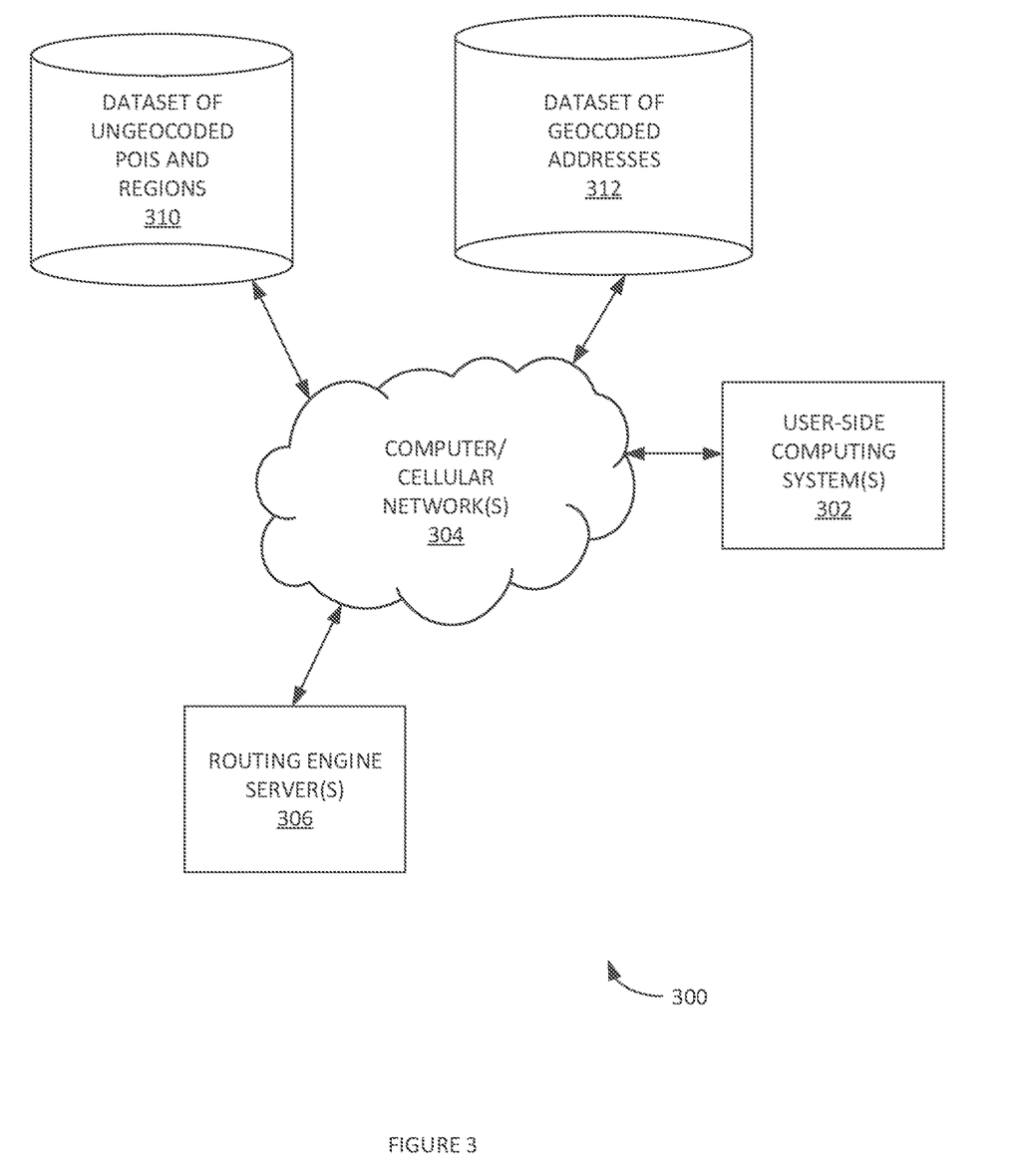
FIG. 3 illustrates an example routing system for implementing automated routing optimization, according to some embodiments.

FIG. 3 illustrates an example routing system 300 for implementing automated routing optimization, according to some embodiments.

In one example, a supply chain optimization entity use routing system 300. Routing system 300 can include a Routing engine server(s) 306. Routing engine server(s) 306 can include one or more routing engines. A routing engines can create a delivery plan of those orders distributed into vehicles. Routing engines can use process 100 and 200 to optimize the delivery plan.

Routing system 300 can include user-side computing system(s) 302. User-side computing system(s) 302 can include various geo-location applications, navigation applications and/or mapping applications. Routing information can be communicated to these application. For example, navigation application can use an Internet connection to a GPS navigation system to provide turn-by-turn voice-guided instructions on how to arrive at a given destination. The navigation application can use a connection to Internet data (e.g. 3G, 4G, WiFi, etc.) and use a GPS satellite connection to determine the user-side computing system(s) 302. Local addresses, regions and/or POI can be identified using processes 100 and 200. A user can enter a destination into the navigation application. This address can be processed by processes 100 and 200. The navigation application can plot a path to it. The navigation application can display the user's progress along the route and issues instructions for each turn.

In the incremental delivery plan, the routing engine of routing engine server(s) 306 retains the existing allocated orders in the same vehicles as before and then allocates all the newly added orders into extra space present in existing vehicles or any newly added vehicles provided while running the incremental delivery plan. In this way, the vehicles that have been previously loaded do not have to be unloaded (except in case of canceled tasks). Only new orders are allocated into them. Routing engine server(s) 306 can repeat the process of adding more tasks and run an incremental plan on as as-needed basis.

Since all tasks are not considered in shuffling for optimization, this solution trades off optimality for convenience in operations. If the number of tasks added later is much less than the original set of tasks considered in the first delivery plan, the gap in optimality is usually quite small.

User-side computing system(s) 302 can be mobile device (s), laptops, etc. that include an automated salesbeat optimization application (e.g. a sales-fleet management application). User-side computing system(s) 302 can communicate delivery and/or load allocation information to Routing engine server(s) 306.

Computer/Cellular networks 304 can include the Internet, text messaging networks (e.g. short messaging service (SMS) networks, multimedia messaging service (MMS) networks, proprietary messaging networks, instant messaging service networks, email systems, etc. Computer/Cellular networks 304 can include cellular networks, satellite networks, etc. Computer/Cellular networks 304 can be used to communicate messages and/or other information (e.g. videos, tests, articles, digital images, videos etc.) from the various entities of routing system 300.

Routing engine server(s) 306 can include various other functionalities such as, inter glia: web servers, SMS servers, IM servers, chat hots, database system managers, e-commerce engines, geo-mapping functionalities, web mapping services, etc. Routing engine server(s) 306 can include manage a mobile-device application in both user-side computing device(s) 102.

Routing engine server(s) 306 can manage an API service which clients may communicate with via RESTful HTTP APIs. These APIs enable a client to pass input data like details of batch of orders to be fulfilled, vehicle information and configurations. This API system stores the details and invokes the route optimization engine to come up with a delivery plan. Routing engine server(s) 306 can accept additional orders on the same batch of orders once the delivery plan is generated. The routing engine can build an incremental solution using an existing delivery plan and newer orders added to the existing batch of orders. The API service can accept newer orders on the same batch of tasks. The routing engine can create an incremental plan based on an existing delivery plan and additional orders.

Routing engine server(s) 306 can manage messages about the batch of orders and existing delivery plan. Data can be stored and read from a common database. Messages containing metadata are passed using queues, and the systems fetch the required data from the database by querying using the metadata from the message.

As shown, Routing engine server(s) 306 can interact with any client systems (e.g. dispatcher(s) computing device(s) 302, etc.). Clients can automatically or manually load vehicles according to the delivery plan generated by the routing engine mentioned. In this way, routing system 300 can simplify operations as vehicles do not have to be reloaded completely on every optimization run.

Routing engine server(s) 306 can utilize machine learning techniques (e.g. artificial neural networks, etc.). Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Figure 4:
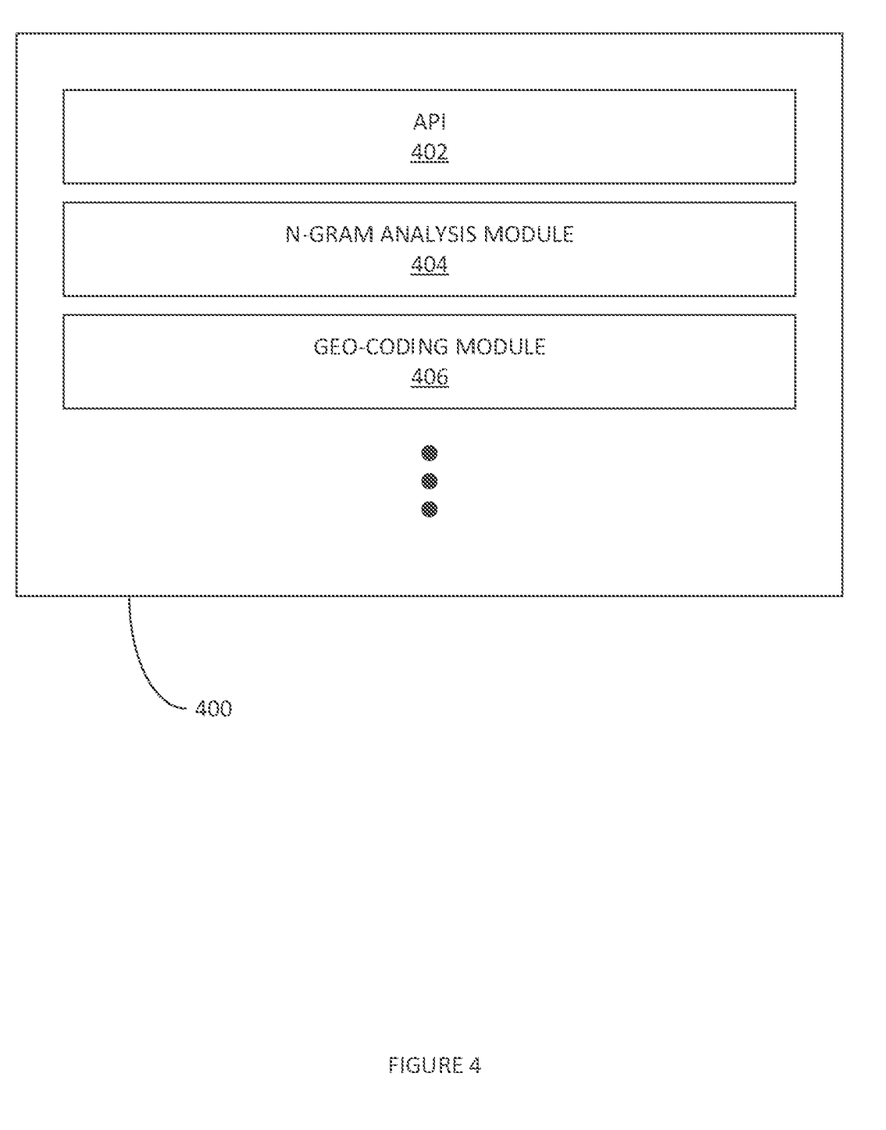
FIG. 4 illustrates an example n-gram analysis geocoding functionality, according to some embodiments.

Routing engine server(s) 306 can include an n-gram analysis geocoding functionality 400. N-gram analysis geocoding functionality 400 can enable routing engine server(s) 306 to geo-code various POIs and/or update a dataset of previously geo-coded POIs. System 300 can include dataset of un-geocoded POIs and regions 310. Un-geocoded pas and regions 310 can be a dataset of raw addresses and associated latlngs (e.g. can be obtained by capturing at the location). System 300 can include dataset of geocoded POIs and regions 312. N-gram analysis geocoding functionality 400 can be used to generate geocoded POIs and regions 312 from un-geocoded POIs and regions 310 (e.g. using processes 100 and 200).

FIG. 4 illustrates an example n-gram analysis geocoding functionality 400, according to some embodiments. N-gram analysis geocoding functionality 400 can include API 402. API 402 can be used to access n-gram analysis geocoding functionality 400. N-gram analysis geocoding functionality 400 can include n-gram analysis module 404. N-gram analysis module 404 can analyze the various texts of POIs, addresses, regions, etc. N-gram analysis 404 can obtain this text from a database (e.g. datastore of un-geocoded POIs and regions 310). N-gram analysis module 404 can break an address up into specified n-grams (e.g. bigrams, trigrams, n-grams, comma-separated values (CSV) grams, etc.). N-gram analysis 404 can aggregate the n-grams various lacing and use this information to find a most reliable latlng for given n-gram (e.g. utilizing various statistical and/or machine learning models). N-gram analysis 404 can use these statistically-based mapping as a decision point on whether to store that n-gram/latlng pair in a database (e.g. geocoded POIs and regions 312). N-gram analysis geocoding functionality 400 can a geo-coding module 406. Geo-coding module 406 can take an input text (e.g. n-geocoded POIs and regions 310, etc.), such as an address or the name of a place, and return a latitude/longitude location to generate a n-gram/latlng pair.

Figure 5:
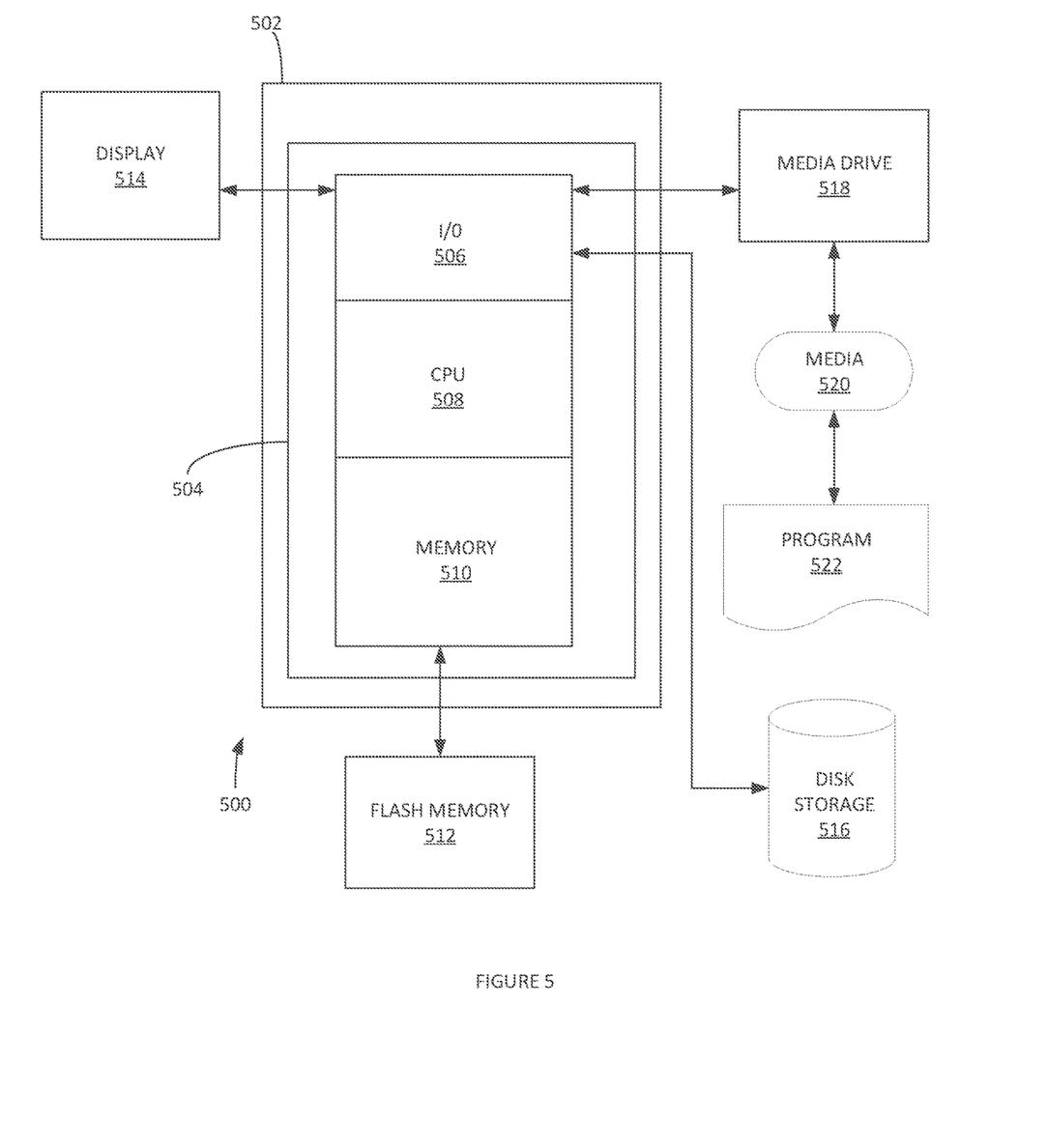
FIG. 5 is a block diagram of a sample computing environment that can be utilized to implement various embodiments.

FIG. 5 depicts an exemplary computing system 500 that can be configured to perform any one of the processes provided herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform any of the processes described herein. The main system 502 includes a motherboard 504 having an I/O section 506, one or more central processing units (CPU) 503, and a memory section 510, which may have a flash memory card 512 related to it. The I/O section 506 can be connected to a display 514, a keyboard and/or other user input (not shown), a disk storage unit 516, and a media drive unit 518. The media drive unit 518 can read/write a computer-readable medium 520, which can contain programs 522 and/or data. Computing system 500 can include a web browser. Moreover, it is noted that computing system 500 can be configured to include additional systems in order to fulfill various functionalities. Computing system 500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

EXAMPLE USE CASE PROCESS

Figure 6:
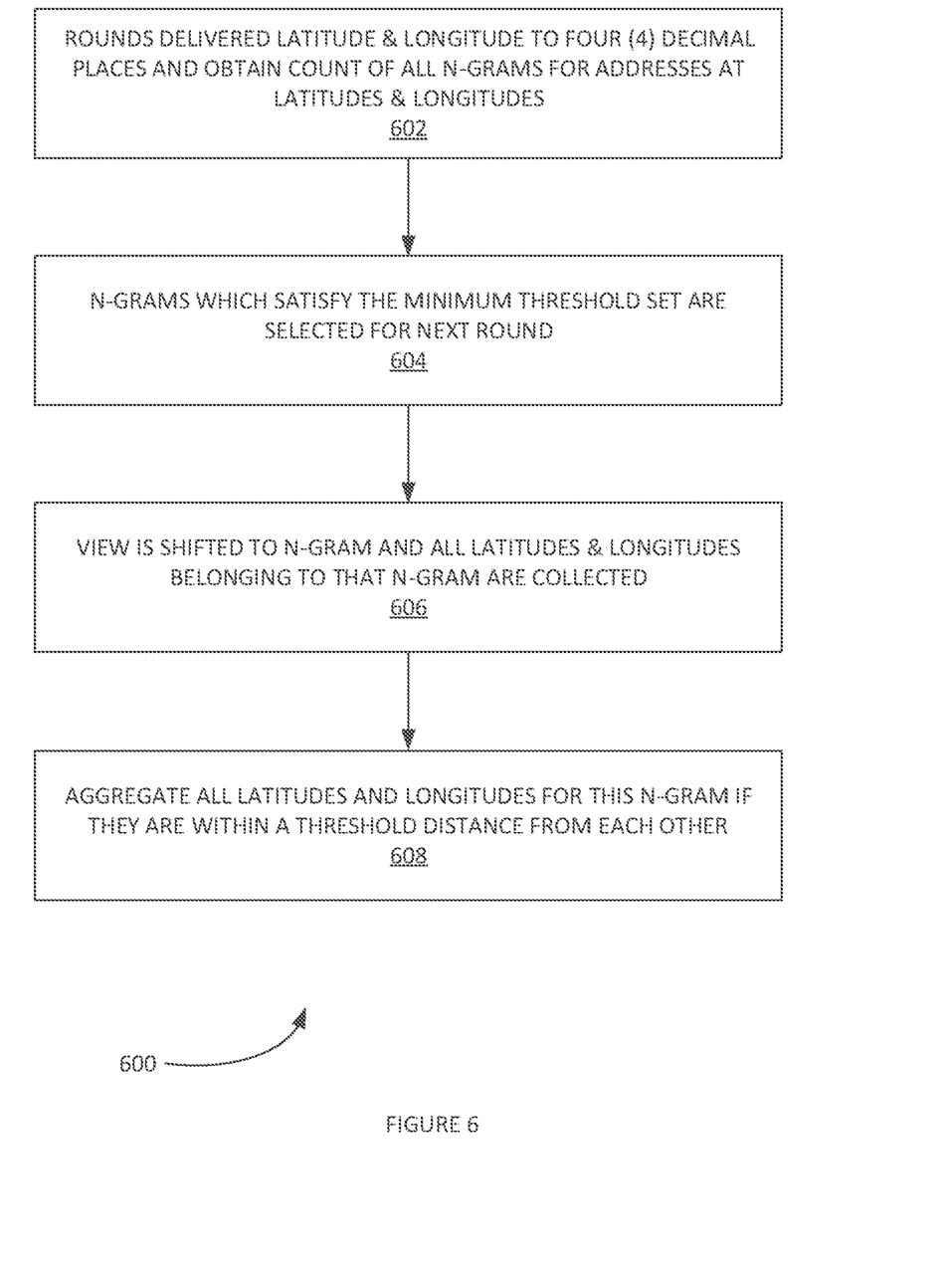
FIG. 6 illustrates an example use case process, according to some embodiments.

FIG. 6 illustrates an example use case process 600, according to some embodiments, in step 602, process 600 rounds the delivered latitude and longitude to four (4) decimal places and obtain a count of all n-grams for addresses at those latitudes and longitudes, in this example, three latitudes and longitudes are chosen to showcase the algorithm. For example:
<Insert File: roundedLatLngAllNgrams>

In step 604, the n-grams which satisfy the minimum threshold set are selected for next round. For example:
<Insert File: roundedLatLngMinThresholdAllNgrams>

In step 606, the view is shifted to the n-gram and all latitudes and longitudes belonging to that n-gram are collected. For this example, process 600 can use the following n-gram: 'athens 2 prestige acropolis'
{'athens 2 prestige acropolis': {'set1': {'roundedLatLng': {'lat': 12.9356,
'lng': 77.6109},
'ngramsCount': 13},
'set2': {'roundedLatLng': {'lat': 12.9356, 'lng': 77.611},
'ngramsCount': 26},
'set3': {'roundedLatLng': {'lat': 12.9355, 'lng': 77.611},
'ngramsCount': 15}}}

In step 608, process 600 can aggregate all the latitudes and longitudes for this n-gram if they are within a threshold distance from each other. The output after this step looks like:
{"ngram": "athens 2 prestige acropolis", "learntLatLng": {"count": 26, "latLng": {"lat": 12.9356, "lng": 77.611}, "confidence": 100, "totalCount": 54, "effectiveCount": 54}}

In this example, there are fifty-four (54) occurrences of the n-gram and all of them are within threshold distance. The most frequent result occurs at {'lat': 12.9356, 'lng': 77.611} and this is chosen as the final answer.

Figure 7:
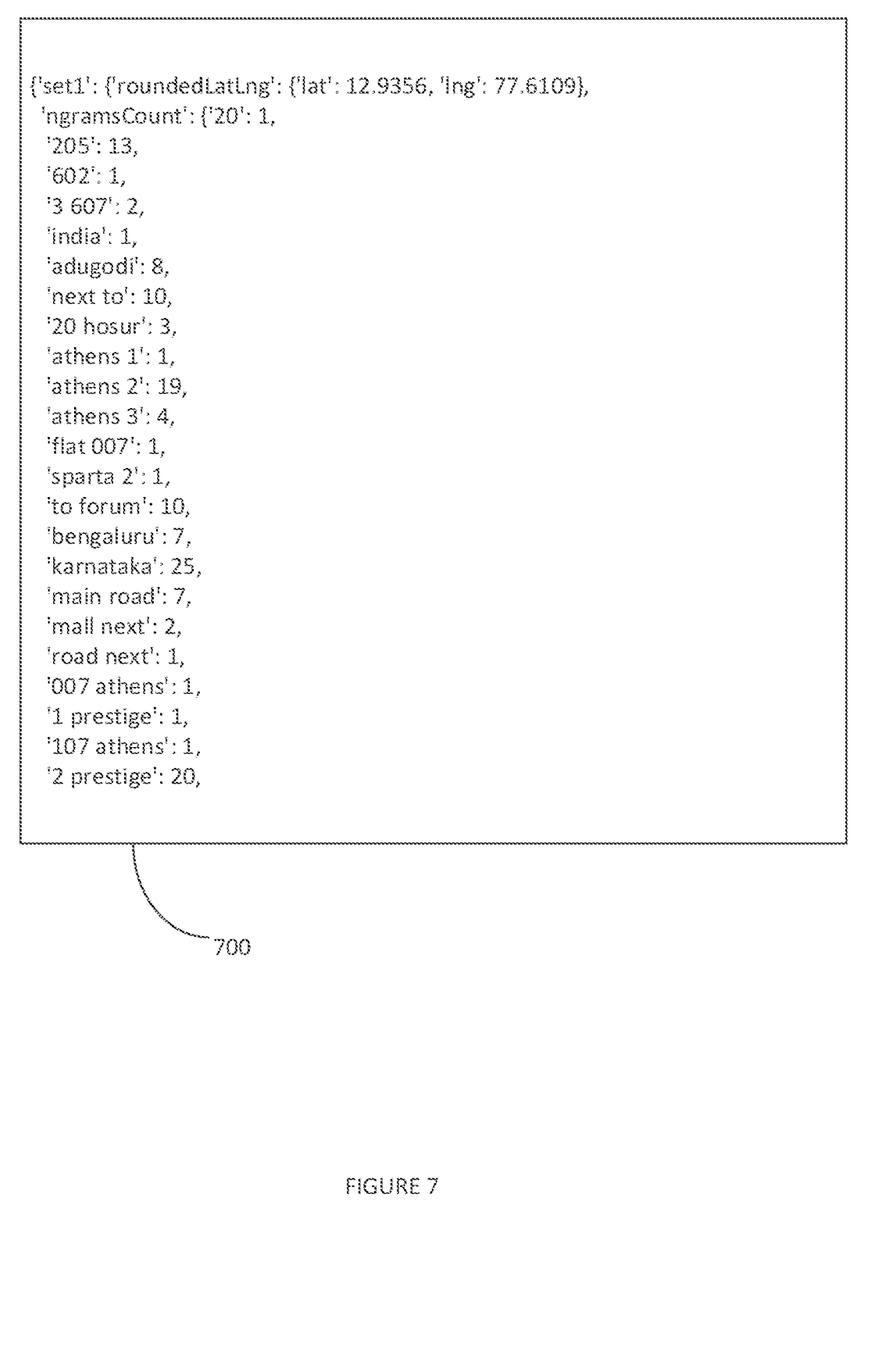
FIG. 7 illustrates an example partial set of roundedLatLngAllNgrams, according to some embodiments.

FIG. 6 illustrates an example use case process 600, according to some embodiments. FIG. 7 illustrates an example partial set of roundedLatLngAllNgrams, according to some embodiments. These roundedLatLngAllNgrams 700 can be used to implement an example of process 600.

Figure 8:
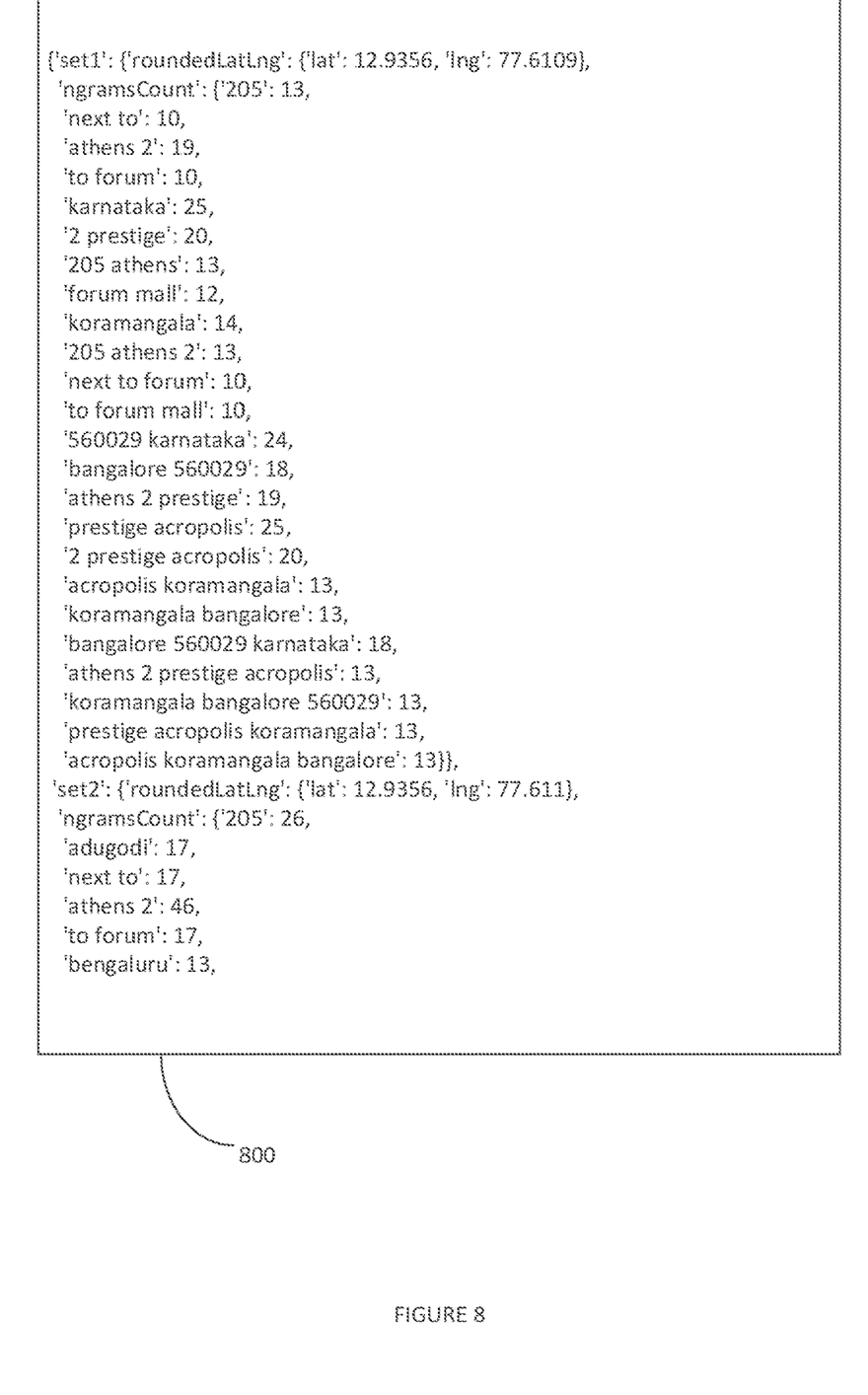
FIG. 8 illustrates an example partial set of roundedLatLngMinThresholdAllNgrams, according to some embodiments.

FIG. 8 illustrates an example partial set of roundedLatLngMinThresholdAllNgrams, according to some embodiments. These roundedlatLngMinThresholdAllNgrams 800 can be used to implement an example of process 600.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for optimizing a geocoding process by automatically determining points of interest (POIs) within a locality comprising:
   providing, from a first database comprising a first set of POIs, wherein the first set of pas are obtained from a government agency;
   geocoding all the Pas in the first database;
   providing a second database of a second set of POIs that exist only in local context but not part of first database maintained by the government agency;
   geocoding all the POIs in the second database; and
   wherein the second database is generated by:
      using n-gram analysis to discover a second set of POIs in a geographic region of the locality of the first database,
      generating a data structure for each POI of the second set of POIs, wherein the data structure comprises an address followed by a latlng pair for each discovered POI,
      clustering all the addresses of the second set of POI that belong to the defined geographic area, and
      flipping each data structure such that a latlng points to an address for each POI of the second set of POIs.

2. The computerized method of claim 1, wherein the second database is further generated by:
   rounding up the latlng of the flipped data structure to four (4) decimal places.

3. The computerized method of claim 2, wherein the second database is further generated by:
   grouping each POI of the second set of POIs by latlng, and
   capturing all addresses belonging to that particular latlng.

4. The computerized method of claim 3, wherein the second database is further generated by:
   breaking each address of each POI of the second set of POIs is broken up into specified set of n-grams,
   for each n-gram, determine all other n-grams which are variants of an original n-gram, and aggregating an n-gram occurrence count.

5. The computerized method of claim 4, wherein the second database is further generated by:
   aggregating each n-gram which exists across a specified set of latlng identifier, and determining a most reliable latlng for a given n-gram.

6. The computerized method of claim 5, wherein the second database is further generated by:
   collect a set of statistical information regarding each n-gram/latlng pair and aggregating a specified set of n-gram/latlng pairs for each defined geographic boundary of the locality.

7. The computerized method of claim 1 further comprising the step of:
   detecting that a POI of the second database has moved to a new location.

8. The computerized method of claim 2 further comprising the step of:
   automatically geocoding the new location.

9. The computerized method of claim 1, wherein the set of POIs comprise a new address and the address in the database is geocoded.

10. The computerized method of claim 1, wherein the set of POIs comprises a set of regions in a city.

11. The computerized method of claim 1, wherein the first database of the set of first POIs comprises an official location of databases maintained by the government agency.

12. The computerized method of claim 1, wherein the data structure where the address points to the latlng information is generated.

* * * * *